(12) United States Patent
Jensen et al.

(10) Patent No.: US 7,394,862 B2
(45) Date of Patent: Jul. 1, 2008

(54) MULTI-MODE WIRELESS POLAR TRANSMITTER ARCHITECTURE

(75) Inventors: Henrik T. Jensen, Long Beach, CA (US); Ahmadreza (Reza) Rofougaran, Marina Del Ray, CA (US)

(73) Assignee: Broadcom Corporation, Irvine, CA (US)

( * ) Notice: Subject to any disclaimer, the term of this patent is extended or adjusted under 35 U.S.C. 154(b) by 616 days.

(21) Appl. No.: 11/019,338

(22) Filed: Dec. 21, 2004

(65) Prior Publication Data

US 2006/0209986 A1   Sep. 21, 2006

(51) Int. Cl.
*H04L 27/10* (2006.01)

(52) U.S. Cl. .............. 375/272; 375/295; 375/273; 375/274; 375/303; 375/305

(58) Field of Classification Search .......... 375/295, 375/146, 272, 274, 273, 303, 305, 308
See application file for complete search history.

(56) References Cited

U.S. PATENT DOCUMENTS 6,138,042 A * 10/2000 Midya et al. ............. 455/571
2004/0246060 A1 * 12/2004 Varis et al. ................ 332/109
2005/0135502 A1 *  6/2005 Zhang et al. .............. 375/297
2006/0062340 A1 *  3/2006 Zheng ....................... 375/376

* cited by examiner

*Primary Examiner*—Chieh M. Fan
*Assistant Examiner*—Siu M Lee
(74) *Attorney, Agent, or Firm*—Garlick Harrison & Markison; Holly L. Rudnick

(57) ABSTRACT

A radio transmitter within a transceiver includes a digital processor and analog circuitry for modulating and transmitting an outgoing digital signal in multiple modes of operation. The digital processor digitally modulates the outgoing digital signal to produce one of a constant envelope modulated digital signal and a variable envelope modulated digital signal based on the particular modulation scheme being used to modulate the outgoing digital signal. In addition, the digital processor filters the outgoing digital signal using filter values selected based on the signal bandwidth of the outgoing digital signal. The analog circuitry converts digital envelope and phase signals of the modulated digital signal to analog envelope and phase signals, and up-converts the analog phase signal from an IF signal to an RF signal, using a loop filter that is programmable based on the signal bandwidth of the outgoing digital signal.

21 Claims, 10 Drawing Sheets

MULTI-MODE WIRELESS POLAR TRANSMITTER ARCHITECTURE

BACKGROUND

1. Technical Field

The present invention relates to wireless communications and, more particularly, wideband wireless communication systems.

2. Related Art

Modern wireless RF transmitters for applications, such as cellular, personal, and satellite communications, employ digital modulation schemes such as frequency shift keying (FSK) and phase shift keying (PSK), and variants thereof, often in combination with code division multiple access (CDMA) communication. Independent of the particular communications scheme employed, the RF transmitter output signal, $s_{RF}(t)$, can be represented mathematically as $$s_{RF}(t) = r(t)\cos(2\pi f_c t + \theta(t)) \quad (1)$$

where $f_c$ denotes the RF carrier frequency, and the signal components $r(t)$ and $\theta(t)$ are referred to as the envelope and phase of $s_{RF}(t)$, respectively.

Some of the above mentioned communication schemes have constant envelope, i,e., $$r(t) = R,$$

and these are thus referred to as constant-envelope communications schemes. In these communications schemes, $\theta(t)$ constitutes all of the information bearing part of the transmitted signal. Other communications schemes have envelopes that vary with time and these are thus referred to as variable-envelope communications schemes. In these communications schemes, both $r(t)$ and $\theta(t)$ constitute information bearing parts of the transmitted signal.

The most widespread standard in cellular wireless communications is currently the Global System for Mobile Communications (GSM). A second generation GSM standard employs Gaussian Minimum Shift Keying (GMSK), which is a constant-envelope binary modulation scheme allowing raw transmission at a maximum rate of 270.83 kilobits per second (kbps). In any mobile communication system, the radio spectrum is a very limited resource shared by all users. GSM employs a combination of Time Division Multiple Access (TDMA) and Frequency Division Multiple Access (FDMA) for the purpose of sharing the spectrum resource. GSM networks typically operate in the 900 MHz frequency range. The radio spectrum in the bands 890-915 MHz is for the uplink (mobile station to base station) and 935-960 MHz is for the downlink (base station to mobile station). The spectrum for both uplink and downlink is divided into 200 kHz wide carrier frequencies using FDMA, and each base station is assigned one or more carrier frequencies. Each carrier is divided into eight time slots using TDMA. Eight consecutive time slots form one TDMA frame, with a duration of 4.615 ms. A physical channel occupies one time slot within a TDMA frame. Each time slot within a frame is also referred to as a burst. TDMA frames of a particular carrier frequency are numbered, and formed in groups of 26 or 51 TDMA frames called multi-frames. While GSM is sufficient for standard voice services, future high-fidelity audio and data services demand higher data throughput rates.

General Packet Radio Service (GPRS) is a new non-voice service that allows information to be sent and received across a mobile telephone network. It supplements today's Circuit Switched Data (CSD) and Short Message Service (SMS). GPRS employs the same modulation scheme as GSM, but higher data throughput rates are achievable with GPRS since it allows for all eight timeslots to be used by a mobile station at the same time.

Even higher data rates are achieved in the specification of the Enhanced Data rates for GSM Evolution (EDGE) cellular telephony standard by selectively applying a $3\pi/8$ offset, 8-level PSK (8-PSK) modulation scheme. With this variable-envelope communication scheme, the maximum bit rate is tripled compared to GSM, while the chosen pulse shaping ensures that the RF carrier bandwidth is the same as that of GSM, allowing for the reuse of the GSM signal bandwidths. Additionally, to further increase the flexibility of data transmission, so-called multi-slot operation has been introduced into GSM/GPRS/EDGE systems. In multi-slot operation, more than one time slot out of the eight in one GSM frame can be used for transmission with GMSK and/or 8-PSK modulation.

As mentioned above, the GMSK modulation scheme of standard GSM is an example of a constant envelope communications scheme. An example transmitter appropriate for such constant-envelope modulation schemes in a mobile station unit is a translational loop transmitter. In this transmitter, the digital baseband data enters a digital processor that performs the necessary pulse shaping and modulation to some intermediate frequency (IF) carrier $f_{IF}$. The resulting digital signal is converted to analog using a digital-to-analog converter (DAC) and a low pass filter (LPF) that filters out undesired digital images of the IF signal. A translational loop, essentially a phase locked loop (PLL), then translates, or up-converts, the IF signal to the desired RF signal and a power amplifier (PA) delivers the appropriate transmit power to the antenna.

As mentioned above, the 8-PSK modulation scheme of EDGE is an example of a variable envelope communications scheme. In practice, the power spectrum emitted from an EDGE transmitter will not be ideal due to various imperfections in the RF transmitter circuitry. Thus, quality measures of the transmitter performance have been established as part of the EDGE standard and minimum requirements have been set. One quality measure that relates to the RF signal power spectrum is the so-called spectral mask. This mask represents the maximum allowable levels of the power spectrum as a function of frequency offset from the RF carrier in order for a given transmitter to qualify for EDGE certification. In other words, the spectral mask requirements limit the amount of transmitter signal leakage into other users' signal spectrum. For example, at a frequency offset of 400 kHz (0.4 MHz), the maximum allowable emission level is −54 dB relative to the carrier (dBc). Another RF transmitter quality measure of the EDGE standard is the modulation accuracy, which relates the RF transmitter modulation performance to an ideal reference signal. Modulation accuracy is related to the so-called error vector magnitude (EVM), which is the magnitude of the difference between the actual transmitter output and the ideal reference signal. The error vector is, in general, a complex quantity and hence can be viewed as a vector in the complex plane. Modulation accuracy is stated in root-mean-square (RMS), 95th percentile, and peak values of the EVM and is specified as a percentage. For a given transmitter to qualify for EDGE certification, the RMS EVM must be less than 9%, the 95th percentile of EVM values must be less than 15%, and the peak EVM value must be less than 30%.

The increase in system flexibility resulting from the introduction of multi-slot operation in EDGE presents the challenge of finding an efficient implementation of a joint GMSK/8-PSK modulator which enables easy and fast switching between GMSK and 8-PSK modulation in consecutive time slots. Such modulation switching must be achieved within the so-called guard interval, merely 30 microseconds (us) long. Further complication is encountered in the domain of the RF signal PA. Exploiting the fact that GMSK is a constant envelope modulation scheme, the PA can typically be driven in saturation mode for higher efficiency when transmitting GSM signals. However, due to the variable-envelope properties of the 8-PSK modulation option in EDGE, driving the PA in saturated mode is not possible. Rather, a certain power back-off of the PA input signal level is required to maintain adequate modulation accuracy. Typical transmitter powers may be 33 dBm in GMSK mode and 27 dBm in PSK mode. Thus, when switching modulation schemes in multi-slot operation from GMSK to 8-PSK, or vice versa, a change of PA input signal level must occur. Such change must be achieved within the guard interval and in such a fashion that switching transients do not violate the spectral mask requirements.

In addition, WCDMA (Wideband Code Division Multiple Access) is the world's leading third generation (3G) technology. With data rates up to 100 times those of today's networks, WCDMA will introduce a new generation of telecommunication into the world and change the way people communicate forever. Providing mobile users with data rates initially up to 384 kbps, and in later releases, up to 14 Mbps, WCDMA is an ultra high-speed, ultra high-capacity radio technology that generates and carries a new range of rich, fast, colorful media that consumers will be able to access over their mobiles (e.g., color graphics, video, digital audio, Internet and e-mail). Occupying an RF channel bandwidth of 5 MHz, WCDMA employs a "spreading sequence" with a chip rate of 3.84 million chips per second (Mcps) and a 4-level PSK, variable-envelope modulation scheme.

It is important to ensure that WCDMA, while operating in different frequency bands and larger bandwidth, is seen as an evolution of the GSM networks. This ensures that investments made in GSM networks will remain profitable for years to come while introducing the support of WCDMA service. In view of this evolution, GSM and WCDMA operators will go through three distinct phases at time progresses and market conditions change. They will move from (i) current voice-centric GSM-only businesses to (ii) nationwide low-speed GPRS wireless data services, with high-speed WCDMA services in select areas, to (iii) focusing solely on high-speed multimedia mobile internet WCDMA and GSM services. The long-term goal is to have a seamless network solution with multi-mode handsets that work on both GSM and WCDMA frequencies, and a network that combines the GSM and WCDMA resources. In the seamless network solution, services are provided over GSM or WCDMA radio access, depending upon radio source availability and service demand, without any input or knowledge of users.

For example, a user boarding a train in a large city and heading for the countryside can carry a multi-mode GSM/WCDMA handset, and maintain a subscription with an operator that has a GSM network with nationwide EDGE coverage. In addition, the operator also has a WCDMA network with coverage in all major cities. If the user is initially is in an area with WCDMA coverage, the user starts a combination voice and video call in the WCDMA mode. As the train moves out of the WCDMA coverage area, the network moves the call to the GSM network, renegotiates the data transfer with the handset application and uses EDGE functionality in the GSM network to continue to send both video and voice. The user now experiences the same voice quality as before, but lower quality for the streaming video.

As mentioned previously, it is important to ensure that WCDMA is seen as an evolution of the GSM networks. As a result, for many years to come, so-called multi-mode radios capable of operating in both GSM and WCDMA signal bandwidths will be in demand. In addition, as mentioned previously, it is important to meet mask requirements when modulation switching occurs (e.g., between GMSK and PSK). Thus, there is a need for a multi-mode radio transceiver capable of operating in multiple RF bands. In addition, there is a need for a multi-mode radio transceiver that is capable of switching between modulation modes, while adhering to spectral mask requirements.

SUMMARY OF THE INVENTION

The present invention provides a radio transmitter that includes circuitry for switching between different modes of operation. For example, the radio transmitter can switch between different signal bandwidths, such as between 200 kHz and 5 MHz. In addition, the radio transmitter can switch between different modulation schemes, such as between Gaussian Minimum Shift Keying (GMSK) and Phase-Shift Keying (PSK). The invention supports continuous modulation switching both ways, i.e., from GMSK to PSK and from PSK to GMSK. Although specific embodiments disclosed herein are directed to GSM/GPRS/EDGE and WCDMA transmitters, the present invention is more generally applicable to switching between any two signal bandwidths and switching between constant envelope and variable envelope modulation schemes.

A radio transmitter formed according to one embodiment of the present invention includes a digital processor and analog circuitry for modulating an outgoing digital signal in any signal bandwidth using any modulation scheme. The digital processor receives the outgoing digital signal, along with both a first control signal indicating a type of modulation and a second control signal indicating a signal bandwidth of the outgoing digital signal. The digital processor includes a modulation switching controller, a pulse shaper, a first filter switching controller and equalizer filters for digitally modulating the outgoing digital signal to produce one of a constant envelope modulated digital signal and a variable envelope modulated digital signal based upon the first control signal.

The modulation switching controller within the digital processor receives the first control signal and produces a modulation control signal to select one of a constant envelope modulation mode and a variable-envelope modulation mode based on the particular modulation scheme being used to modulate the outgoing digital signal. The pulse shaper receives the modulation control signal and produces the constant envelope modulated digital signal in the constant envelope modulation mode and the variable envelope modulated digital signal in the variable envelope modulation mode. Both the constant envelope modulated digital signal and the variable envelope modulated digital signal each include an envelope signal and a phase signal. The envelope signal of the constant envelope modulated digital signal is a constant envelope signal, while the envelope signal of the variable envelope modulated digital signal is a variable envelope signal.

The first filter switching controller receives the second control signal and produces a first filter control signal to select one of a first equalizer filter value and a second equalizer filter value based on the signal bandwidth of the outgoing digital signal. The equalizer filters are programmable with one of the first filter value and the second filter value based on the first filter control signal to filter the envelope signal and the phase signal to produce a filtered envelope signal and a filtered phase signal. In one embodiment the equalizer filters include phase and envelope magnitude equalizers and phase and envelope group delay equalizers for pre-distorting the envelope and phase signals, respectively, to substantially compensate for expected distortion in the analog portion of the envelope and phase paths along which the envelope and phase signals, respectively, propagate.

The filtered envelope and phase signals are converted from digital signals to analog signals by first and second Digital-to-Analog converters (DACs) to produce an analog envelope signal and an analog phase signal. The analog envelope signal and the analog phase signal are filtered by first and second low pass filters, respectively. A translational loop up-converts the analog phase signal from an IF signal to an RF signal, using a loop filter that is programmable based on the signal bandwidth of the outgoing digital signal. The RF signal and analog envelope signal are combined by a power amplifier to produce a modulated RF signal.

In one embodiment, the translational loop includes a second filter switching controller for receiving the second control signal and producing a second filter control signal to select one of a first loop filter value and a second loop filter value based on the second control signal. The loop filter is programmed with one of the first loop filter value and the second loop filter value based on the second filter control signal to filter the analog phase signal.

The above-referenced description of the summary of the invention captures some, but not all, of the various aspects of the present invention. The claims are directed to some of the various other embodiments of the subject matter towards which the present invention is directed. In addition, other aspects, advantages, and novel features of the invention will become apparent from the following detailed description of the invention when considered in conjunction with the accompanying drawings.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
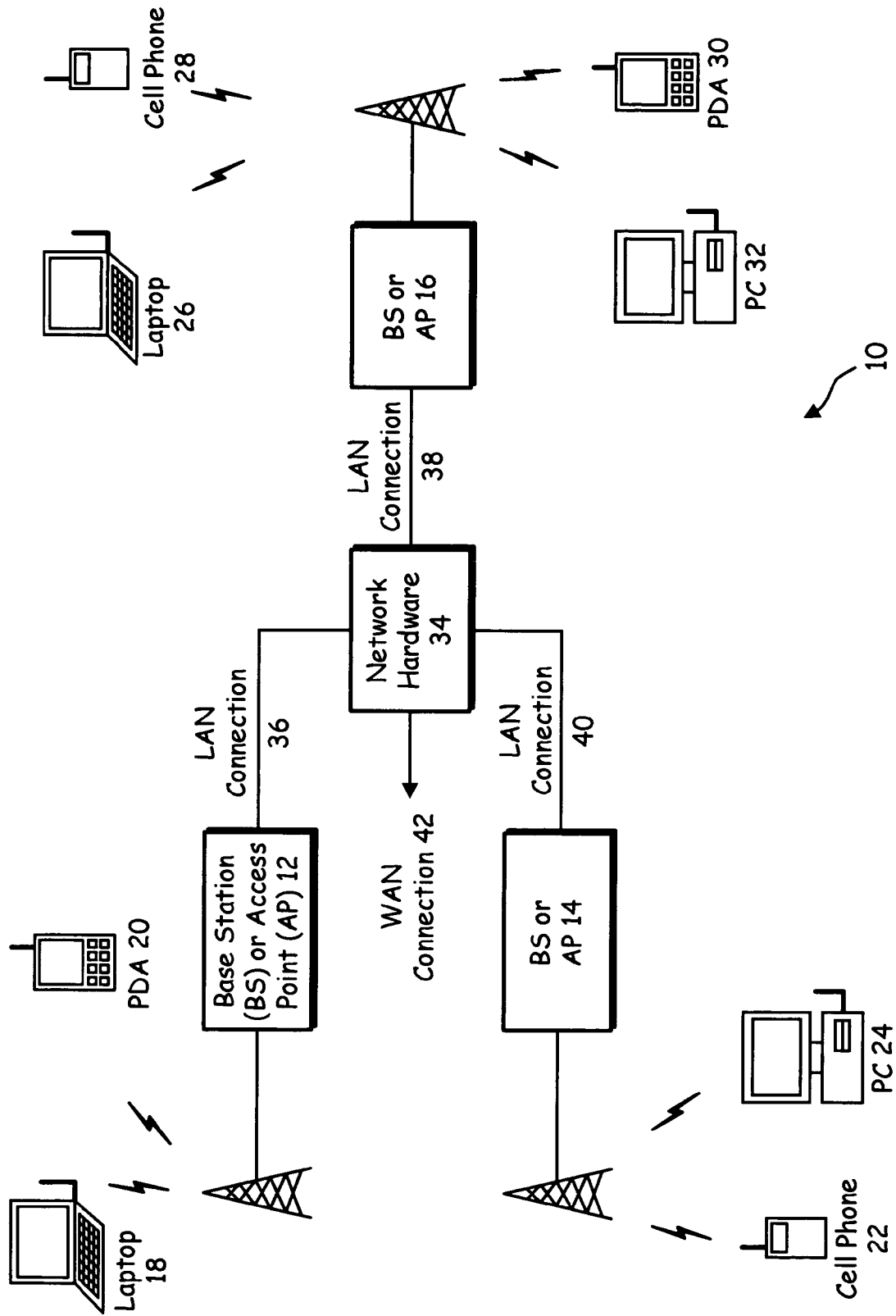
FIG. 1 is a functional block diagram illustrating a communication system that includes a plurality of base stations or access points (APs), a plurality of wireless communication devices and a network hardware component.

FIG. 1 is a functional block diagram illustrating a communication system 10 that includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIGS. 2-9.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. For example, access points are typically used in Bluetooth systems. Regardless of the particular type of communication system, each wireless communication device and each of the base stations or access points includes a built-in radio and/or is coupled to a radio. The radio includes a transceiver (transmitter and receiver) for modulating/demodulating information (data or speech) bits into a format that comports with the type of communication system.

Figure 2:
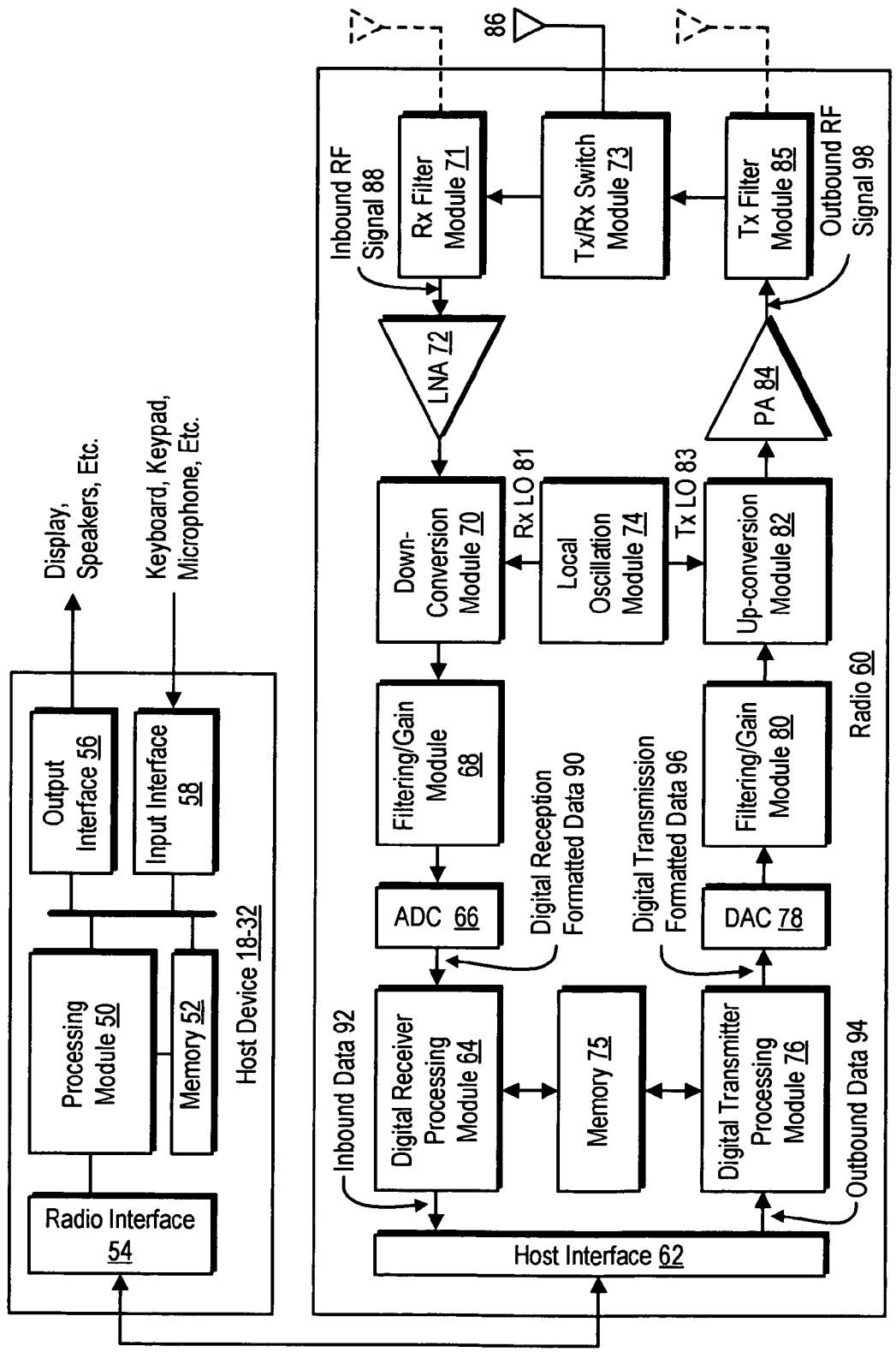
FIG. 2 is a schematic block diagram illustrating a wireless communication device as a host device and an associated radio.

FIG. 2 is a schematic block diagram illustrating a wireless communication device 18-32 as a host device and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host wireless communication device 18-32 includes a processing module 50, a memory 52, a radio interface 54, an input interface 58 and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output device, such as a display, monitor, speakers, etc., such that the received data may be displayed. The radio interface 54 also provides data from the processing module 50 to the radio 60. The processing module 50 may receive the outbound data from an input device, such as a keyboard, keypad, microphone, etc., via the input interface 58 or generate the data itself For data received via the input interface 58, the processing module 50 may perform a corresponding host function on the data and/or route it to the radio 60 via the radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (TX/RX) switch module 73, a local oscillation module 74, a memory 75, a digital transmitter processing module 76, a digital-to-analog converter 78, a filtering/gain module 80, an IF mixing up-conversion module 82, a power amplifier 84, a transmitter filter module 85, and an antenna 86. The antenna 86 is shared by the transmit and receive paths as regulated by the TX/RX switch module 73. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and/or modulation.

The digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the digital receiver processing module 64 and/or the digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and the digital receiver processing module 64 and/or the digital transmitter processing module 76 executes, operational instructions corresponding to at least some of the functions illustrated herein.

In operation, the radio 60 receives outbound data 94 from the host wireless communication device 18-32 via the host interface 62. The host interface 62 routes the outbound data 94 to the digital transmitter processing module 76, which processes the outbound data 94 in accordance with a particular wireless communication standard (e.g., GSM, EDGE, WCDMA, etc.) to produce digital transmission formatted data 96. The digital transmission formatted data 96 produced by a digital modulator of the present invention will be a digital baseband signal or a digital low IF signal, where the low IF typically will be in the frequency range of 100 KHz to a few Megahertz.

The digital-to-analog converter 78 converts the digital transmission formatted data 96 from the digital domain to the analog domain. The filtering/gain module 80 filters and/or adjusts the gain of the analog baseband signal prior to providing it to the up-conversion module 82. The up-conversion module 82 directly converts the analog baseband signal, or low IF signal, into an RF signal based on a transmitter local oscillation 83 provided by local oscillation module 74. Local oscillation module 74 is, in one embodiment of the invention, a multi-stage mixer as described herein. The power amplifier 84 amplifies the RF signal to produce an outbound RF signal 98, which is filtered by the transmitter filter module 85. The antenna 86 transmits the outbound RF signal 98 to a targeted device, such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the TX/RX switch module 73, where the RX filter module 71 bandpass filters the inbound RF signal 88. The RX filter module 71 provides the filtered RF signal to low noise amplifier 72, which amplifies the inbound RF signal 88 to produce an amplified inbound RF signal. The low noise amplifier 72 provides the amplified inbound RF signal to the down-conversion module 70, which directly converts the amplified inbound RF signal into an inbound low IF signal or baseband signal based on a receiver local oscillation signal 81 provided by local oscillation module 74. Local oscillation module 74 is, in one embodiment of the invention, a multi-stage mixer as described herein. The down-conversion module 70 provides the inbound low IF signal or baseband signal to the filtering/gain module 68. The filtering/gain module 68 may be implemented in accordance with the teachings of the present invention to filter and/or attenuate the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host wireless communication device 18-32 via the radio interface 54.

As one of average skill in the art will appreciate, the wireless communication device of FIG. 2 may be implemented using one or more integrated circuits. For example, the host device may be implemented on a first integrated circuit, while the digital receiver processing module 64, the digital transmitter processing module 76 and memory 75 are implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of host device 18-32 and the digital receiver processing module 64 and the digital transmitter processing module 76 of radio 60 may be a common processing device implemented on a single integrated circuit. Further, memory 52 and memory 75 may be implemented on a single integrated circuit and/or on the same integrated circuit as the common processing modules of processing module 50, the digital receiver processing module 64, and the digital transmitter processing module 76.

Figure 3:
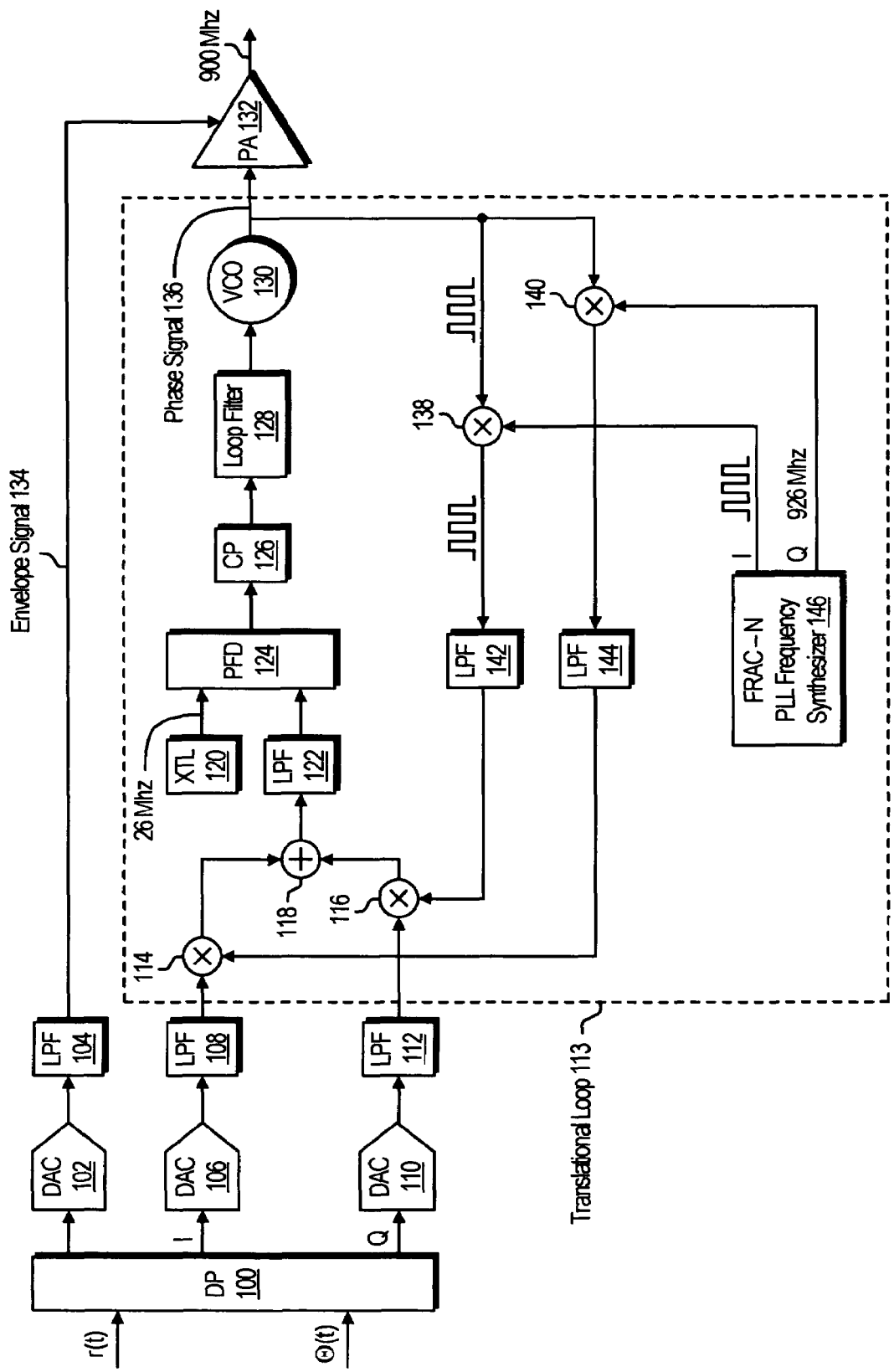
FIG. 3 is a schematic block diagram of a polar transmitter for the GSM/GPRS/EDGE and WCDMA cellular telephony application.

FIG. 3 is a schematic block diagram of a polar RF transmitter. The polar RF transmitter of FIG. 3 is functionally equivalent to blocks 76, 78, 80, 82, an 84 of FIG. 2. One typical application of the RF transmitter of FIG. 3 is EDGE cellular telephony, though the concepts may readily be applied to other types of communication networks. In FIG. 3, it is assumed that a baseband processor delivers baseband envelope signal r(t) and baseband phase signal θ(t) to the radio transmitter for further processing and RF transmission. The transmitter includes a digital processor (DP) 100 that performs the necessary pulse shaping, modulation, and interpolation filtering, followed by in-phase and quadrature digital-to-analog converters (DACs) 102-110, low pass filters (LPFs) 104-112, a translational loop 113, and a power amplifier (PA) 132. The low pass filtered in-phase and quadrature signals are operably coupled to mixers 114 and 116, respectively, and a summing node 118 that combines the mixer outputs that are then low pass filtered by LPF 122. The remaining components of the transmitter are a phase and frequency detector (PFD) 124, 26 MHz crystal reference (X-TAL) 120, a charge pump (CP) 126, a low pass loop filter 128, a voltage controlled oscillator (VCO) 130, a pair of offset mixers 138 and 140, as well as appropriate LPFs 142 and 144. RF channel selection is achieved by employing a Fractional N frequency synthesizer 146.

A qualitative description of the operation of the translational loop is as follows. It is easy to show that low pass filtering the sum of the mixing products of the intermediate frequency (IF) I & Q components with down-converted RF output I & Q components generates a 26 MHz sinusoid whose excess phase component equals the difference between the desired phase signal and the RF output phase signal. The 26 MHz carrier is extracted by the PFD whose output is the phase error signal. With proper PLL design, the closed loop tracking action causes the error signal to approach zero, thus the phase of the RF output carrier at 900 MHz tracks the phase of the IF signal, as desired. The RF output carrier is modulated in the PA by envelope signal 134.

Figure 4:
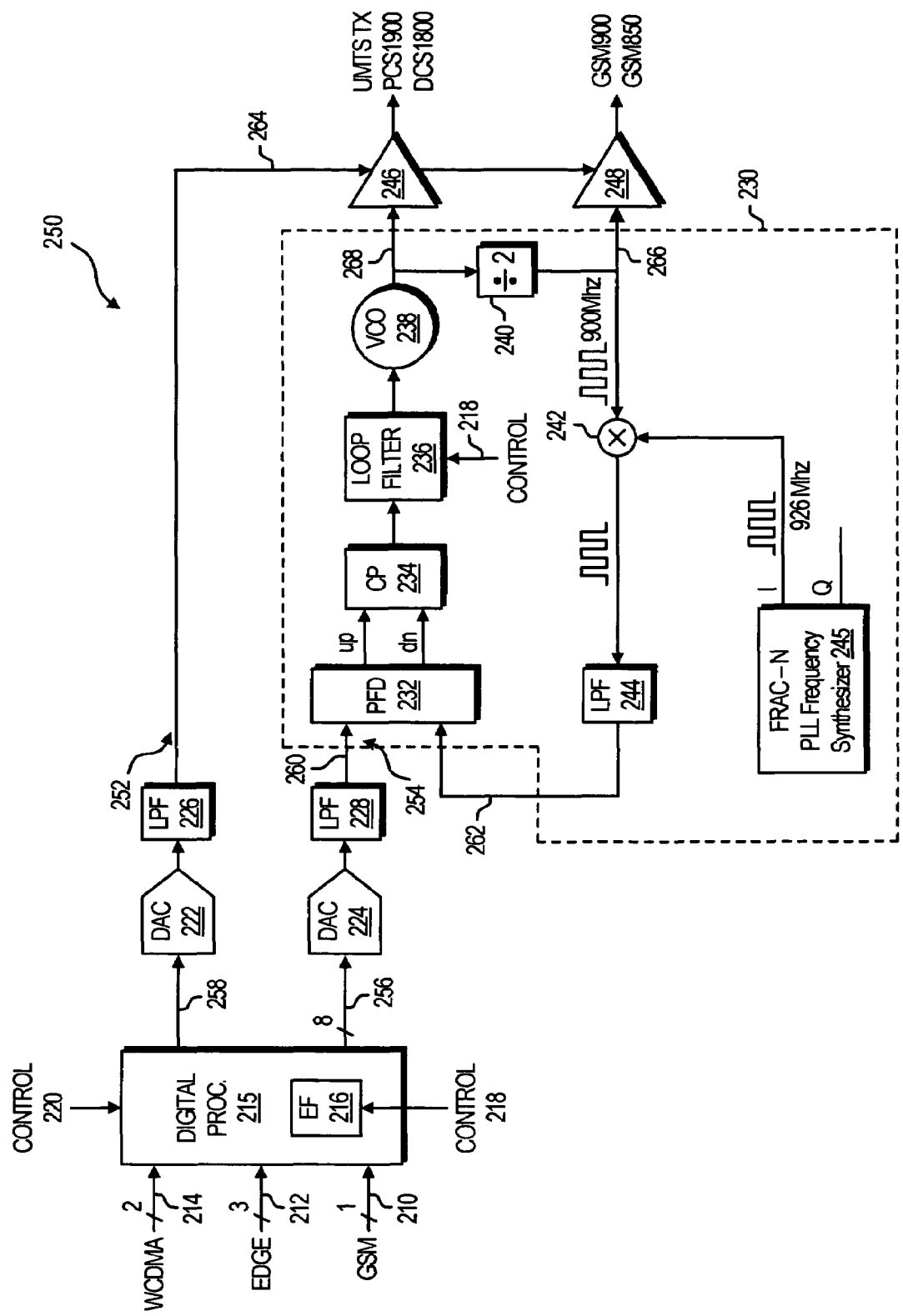
FIG. 4 is a schematic block diagram of a polar RF transmitter within a transceiver capable of modulating communication signals in different modes of operation, in accordance with embodiments of the present invention.

FIG. 4 is a schematic block diagram of a polar RF transmitter 250 within a transceiver capable of modulating communication signals in different modes of operation, in accordance with embodiments of the present invention. Examples of different modes of operation include GSM, EDGE and WCDMA cellular telephony. The polar RF transmitter 250 of the present invention includes a translational loop 230 with a first amplitude modulated PA 246 for transmitting signals in a first signal bandwidth (e.g., 5 MHz) and a second amplitude modulated PA 248 for transmitting signals in a second signal bandwidth (e.g., 200 kHz). The digital processor 215 is capable of using different modulation schemes (e.g., PSK or GMSK), depending on a modulation type indicated by a first control signal 220. Digital equalizer filters 216 within the digital processor 215 and the loop filter 236 within the translational loop 230 are programmable, depending on a signal bandwidth indicated by a second control signal 218. In one embodiment, a narrowband loop filter 236 and corresponding equalizer filters 216 are employed for GSM/EDGE operation, while in another embodiment, a wideband loop filter 236 and corresponding equalizer filters 216 are employed for WCDMA operation.

For example, when operating in GSM mode, an outgoing 1-bit digital signal 210 enters the digital processor 215 at a rate of 270.833 kHz. The first control signal 220 instructs the digital processor 215 to perform pulse shaping and modulation on the outgoing digital signal 210 to produce a constant envelope modulated digital signal. In addition, the digital processor 215 filters the constant envelope modulated digital signal using equalizer filters 216 programmed to operate on a signal bandwidth of approximately 200 kHz in the 900 MHz frequency range based on a logical value of the second control signal 218. As described above, the GSM standard employs Gaussian Minimum Shift Keying (GMSK), which is a constant-envelope binary modulation scheme. Therefore, the envelope path of the digital processor 215 is not activated to ensure that no dynamic signal is transmitted on an analog envelope path 252. As an example, in one embodiment, the envelope signal is set to a constant value of one. Thus, in GSM mode, the digital processor 215 modulates the outgoing digital signal 210 along the phase path only, and generates an 8-bit digital signal that contains a modulated 26 MHz intermediate frequency signal 256. The pulse shaping filter employed in GMSK mode is a Gaussian filter with a BT product of 0.3.

The digital phase signal 256 is input to a high sample rate digital-to-analog converter (DAC), followed by a LPF to filter out any digital images to produce a 26 MHz modulated analog reference signal 260 that is transmitted along an analog phase path 254. The analog reference signal 260 enters the PFD 232, where it is compared to a feedback signal 262 coming from feedback mixer 242 and LPF 244. As described above in connection with FIG. 3, the translational loop 230, including the PFD 232, CP 234, low pass loop filter 236, VCO 238, divide-by-2 module 240, feedback mixer 242 and LPF 244, operates to enable the phase of the RF output carrier 266 at 900 MHz to track the phase of the reference signal 260. RF channel selection is again achieved by employing a Fractional N frequency synthesizer 245. The second control signal 218 programs the loop filter 236 with filter values designed for operation with a signal bandwidth of 200 kHz. The RF output carrier 266 is modulated in the second PA 248 by the analog envelope signal 264, which as discussed above, is set to one. As such, the output of the second PA 248 while in GSM mode is in effect an unmodulated RF carrier.

When operating in EDGE mode, an outgoing 3-bit digital signal 212 enters the digital processor 215 at a rate of 270.833 kHz. The first control signal 220 instructs the digital processor 215 to perform pulse shaping and modulation on the outgoing digital signal 212 to produce a variable envelope modulated digital signal. In addition, the second control signal 218 has the same logical value as in GSM mode to enable the digital processor 215 to filter the variable envelope modulated digital signal using equalizer filters 216 programmed for narrowband mode. As described above, the EDGE standard employs Phase Shift Keying (PSK), which is a variable envelope modulation scheme. Therefore, the envelope path of the digital processor 215 is activated in EDGE mode, and the digital processor 215 modulates the outgoing digital signal 212 along both the envelope path and the phase path to generate digital envelope and digital phase signals 258 and 256, respectively.

The digital envelope signal 258 is input to a high sample rate DAC 222, followed by a LPF 226 along the analog envelope path 252. The digital phase signal 256 is input to high sample rate DAC 224, followed by LPF 228 to produce the analog reference signal 260 along the analog phase path 254. The analog reference signal 260 enters the translational loop 230 to enable the phase of the RF output carrier 266 at 900 MHz to track the phase of the analog reference signal 260. The second control signal 218 programs the loop filter 236 with the same filter values as in the GSM mode, which are designed for operation with a signal bandwidth of 200 kHz. The RF output carrier 266 is modulated in the second PA 248 by the analog envelope signal 264.

When in WCDMA mode, an outgoing 2-bit digital signal 214 enters the digital processor 215 at a rate of 3.84 MHz. The first control signal 220 instructs the digital processor 215 to perform pulse shaping and modulation on the outgoing digital signal 214 to produce a variable envelope modulated digital signal, as in EDGE mode. However, the logical value of the second control signal 218 is different than in the GSM or EDGE mode to enable the digital processor 215 to use equalizer filters 216 programmed to operate in wideband mode. As described above, the WCDMA standard also employs Phase Shift Keying (PSK), which is a variable envelope modulation scheme. Therefore, the envelope path of the digital processor 215 is activated in WCDMA mode (as in EDGE mode), and the digital processor 215 modulates the outgoing digital signal 214 along both the digital envelope path and the digital phase path to generate digital envelope and digital phase signals 258 and 256, respectively.

The digital envelope signal 258 is input to high sample rate DAC 222, followed by LPF 226 along analog envelope path 252. The digital phase signal 256 is input to high sample rate DAC 224, followed by LPF 228 to produce the analog reference signal 260 along the analog phase path 254. The analog reference signal 260 enters the translational loop 230 to enable the phase of the RF output carrier 268 at 1900 MHz to track the phase of the analog reference signal 260. The second control signal 218 programs the loop filter 236 with filter values designed for operation with a signal bandwidth of 5 MHz. The RF output carrier 268 is modulated in the first PA 246 by the analog envelope signal 264. It should be mentioned that different pulse shaping filters are employed in EDGE and WCDMA mode. Specifically, in EDGE mode, a square-root raised cosine (RRC) filter with a roll-off factor of 0.4 is employed, while in WCDMA mode, an RRC filter with a roll-off factor of 0.22 is employed.

Figure 5:
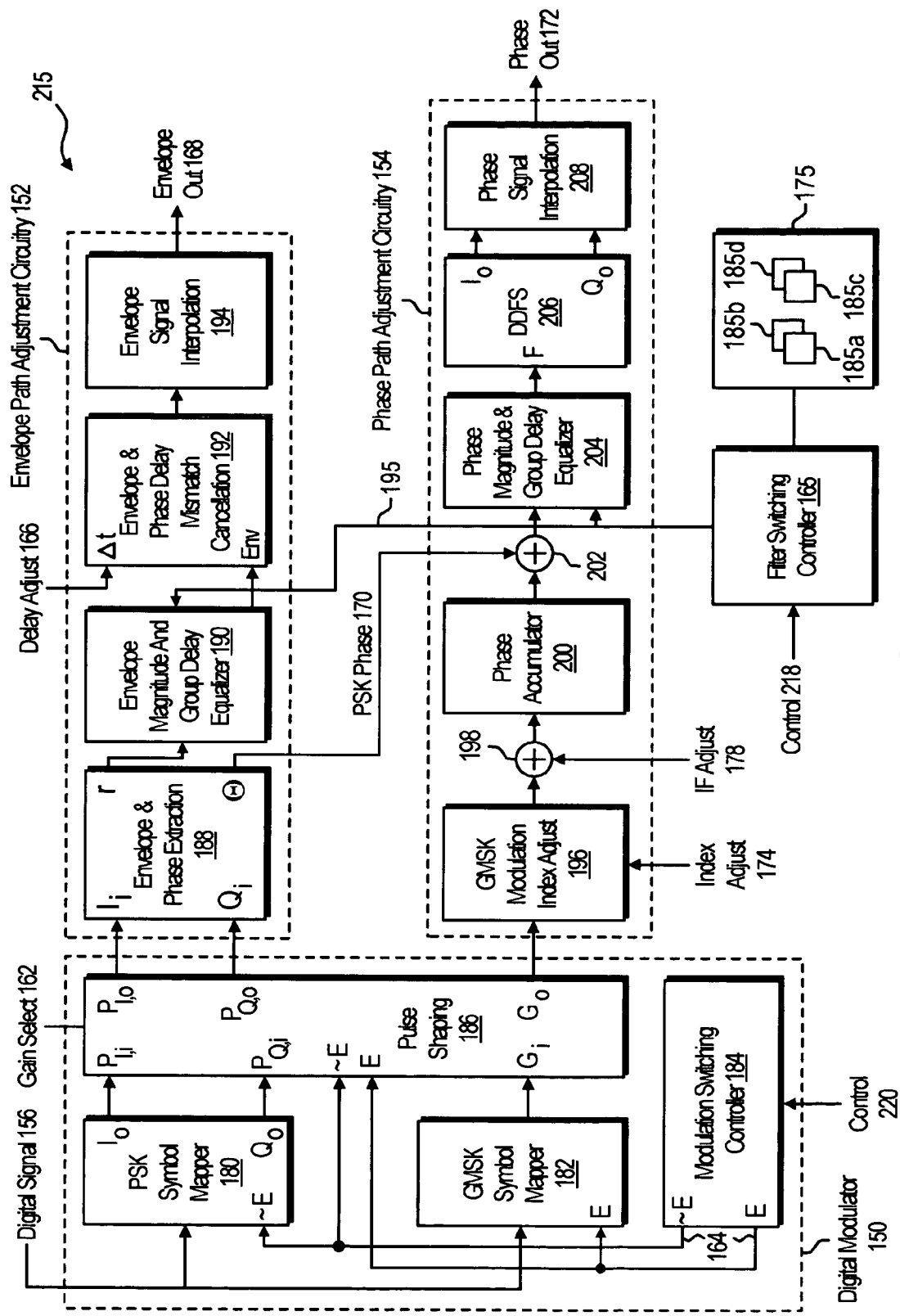
FIG. 5 is a schematic block diagram of a digital processor for use in a polar RF transmitter within a transceiver capable of modulating communication signals in different modes of operation, in accordance with an embodiment of the present invention.

FIG. 5 is a functional block diagram of a digital processor 215 for use in a polar RF transmitter within a transceiver capable of modulating communication signals in different modes of operation, in accordance with an embodiment of the present invention. The digital processor 215 includes a plurality of processing blocks, some of which are programmable in order to produce a digital processor 215 suitable for use in multiple modes, such as GSM, EDGE and WCDMA. The digital processor 215 of the present invention is generally applicable to any polar RF transmitter intended to support continuous switching between PSK and GMSK modulation modes and between two different signal bandwidths, although the described embodiment is directed to the GSM, EDGE and WCDMA standards.

The digital processor 215 includes a digital modulator 150, envelope path adjustment circuitry 152, and phase path adjustment circuitry 154. In operation, digital modulator 150 receives an outgoing digital signal 156 and produces envelope information and phase information based on the outgoing digital signal 156, a gain select 162, and a modulation control signal 164 received from a baseband processor (not shown). Envelope path adjustment circuitry 152 receives envelope information 158 and a delay adjust 166 to provide pre-distortion, delay mismatch cancellation, and up-conversion to produce an envelope out 168. Additionally, envelope path adjustment circuitry 152 produces PSK phase 170 to phase path adjustment circuitry 154. The PSK phase 170 provides PSK phase information during the guard time between modulation mode changes from PSK to GMSK to prevent abrupt phase changes that contribute to spectral re-growth into adjacent transmission channels. Phase path adjustment circuitry 154 receives phase information 160 and PSK phase 170 to produce the phase out 172. Index adjust 174 adjusts the GMSK modulation index, if necessary while IF adjust 178 is used to make minor adjustments to the IF signal.

More specifically, as shown in FIG. 5, the digital modulator 150 receives the outgoing digital signal 156 and the first control signal 220. The outgoing digital signal 156 consists of either single bit data for GMSK modulation (in GSM mode), three bit data for 8-PSK modulation (in EDGE mode) or two bit data for 4-PSK modulation (in WCDMA mode). The data bits in the outgoing digital signal 156 are mapped to transmitter symbols by a PSK symbol mapper 180 and a GMSK symbol mapper 182. Modulation switching controller 184 enables one of PSK symbol mapper 180 or GMSK symbol mapper 182 based on a setting of a modulation control signal 164 generated in response to receipt of the first control signal 220. The modulation control signal 164 includes an enable signal (E) and a Not Enable signal (~E) operably coupled from modulation switching controller 184 to GMSK symbol mapper 182, pulse shaping block 186, and PSK symbol mapper 180. In additional embodiments, the modulation control signal 164 can also include a third control signal to switch the PSK symbol mapper 180 between 4-PSK and 8-PSK modulation, depending on whether the transmitter is operating in EDGE or WCDMA mode.

The symbols produced by PSK symbol mapper 180 and GMSK symbol mapper 182 are operably coupled to pulse shaping block 186 where the symbols are pulse shaped by a plurality of transmit filters. The process of pulse shaping ensures that the transmitted RF signal is sufficiently band limited so as to not interfere excessively with adjacent RF channels. Specifically, pulse shaping block 186 implements Finite Impulse Response (FIR) filters for the pulse shaping, consisting of a Gaussian filter with a BT product of 0.3 for the GMSK transmit mode. A similar filter is employed for the PSK mode. The BT product represents a degree of filtering and is derived from the product of the filter 3 dB bandwidth and the bit period of the transmission. The PSK filtered symbols produced by pulse shaping block 186 are complex consisting of in-phase (I) and quadrature (Q) components.

Envelope and Phase Extraction 188 converts the PSK in-phase and quadrature components produced by pulse shaping block 186 to a phase component, θ, and a magnitude (envelope) component, "r". The envelope signal is subsequently processed by an Envelope Magnitude and Group Delay Equalizer Filter 190 that pre-distorts the envelope magnitude and group delay response to counteract non-ideal processing by the analog components of the transmitter, as described in more detail below in connection with FIG. 8. Envelope magnitude and group delay equalizer filter 190 and phase magnitude and group delay equalizer filter 204 correspond to the equalizer filters 216 in FIG. 4 and provide digital pre-distortion of the envelope signal and phase signal, respectively. The transmitter contains analog components that impose a certain amount of distortion on the transmitted signal. Such distortion can largely be categorized as magnitude variation and group delay variation. If left uncompensated, such distortion typically leads to degraded modulator performance in the form of unacceptable modulation errors. The equalizer filters 190 and 204 of FIG. 5 are typically digital filters, either Finite Impulse Response (FIR) or Infinite Impulse Response (IIR), and may be divided into two separate sections; one section that pre-distorts the magnitude response and one section that pre-distorts the group delay response.

In accordance with embodiments of the present invention, filter switching controller 165 programs the envelope magnitude and group delay equalizer filter 190 and phase magnitude and group delay equalizer filter 204 with one of two sets of filter coefficients 185 (e.g., either set 185a or set 185b for the envelope magnitude and group delay equalizer filter 190 and either set 185c or set 185d for the group delay equalizer filter 190) based on a filter control signal 195 generated in response to receipt of the second control signal 218. The sets 185 of filter coefficients can be stored, for example, in a memory 175, and retrieved by the filter switching controller 165 to program the magnitude and group delay equalizer filters 180 and 190 with the filter control signal 195. Each set 185 of filter coefficients is designed for operation with a different signal bandwidth. For example, sets 185a and 185c may be designed to operate with a 200 kHz signal bandwidth, while sets 185b and 185d may be designed to operate with a 5 MHz signal bandwidth.

Envelope and phase signal delay mismatch cancellation 192 imposes a programmable delay on the envelope signal specified by the parameter delay adjust 166. In either EDGE or WCDMA mode (or any mode producing a variable envelope modulated signal), the circuitry used in the envelope and phase signal delay mismatch cancellation 192 can be the same to reduce the amount of circuitry needed to support multiple modes. The sampling rate of the envelope signal is then increased to an appropriate value by envelope signal interpolation 194, which also performs appropriate signal quantization to remove most of the quantization noise. The sampling rate of the envelope signal is increased to an appropriate value by the envelope signal interpolation block, which also performs appropriate signal quantization.

The pulse shaped Gaussian signal, Go, whose modulation index is nominally set to 0.5, can be fine adjusted by GMSK modulation index adjust 196 based on index adjust 174. The resulting signal is operably coupled to a summing junction 198 where it is summed with an IF adjust 178 to fine adjust the IF signal, if necessary. Phase accumulator 200 adds the incoming phase signal with a previous (in time) phase signal delayed by one bit period. The resulting summed phase signal is combined with the phase component of the PSK signal, PSK phase 170. As previously discussed, adding the PSK phase 170 provides a smooth transition during the transition from PSK to GMSK modulation modes. Phase magnitude and group delay equalizer filter 204 pre-distorts the signal from summing junction 202 to counteract distortion imposed by subsequent processing by the analog transmitter components. Phase magnitude and group delay equalizer filter 204 is also programmed with one of two sets of filter coefficients in order to operate in the appropriate signal bandwidth.

The pre-distorted signal is up-converted by Direct Digital Frequency Synthesizer (DDFS) 206 then the sampling rate of the modulated complex signal is increased to an appropriate value by phase signal interpolation 208, which also performs appropriate signal quantization. Phase signal interpolation 208 is appropriate for the EDGE and WCDMA polar RF transmitter architecture. The 3.25 MHz $I_o$ and $Q_o$ input signals are up-converted by a 32× up-converter to 104 MHz then low pass filtered and mixed with a local oscillation to extract the signal information from the in-phase and quadrature signals $I_o$ and $Q_o$, respectively. The resultant signals are summed to produce the phase output signal 172.

Figure 6:
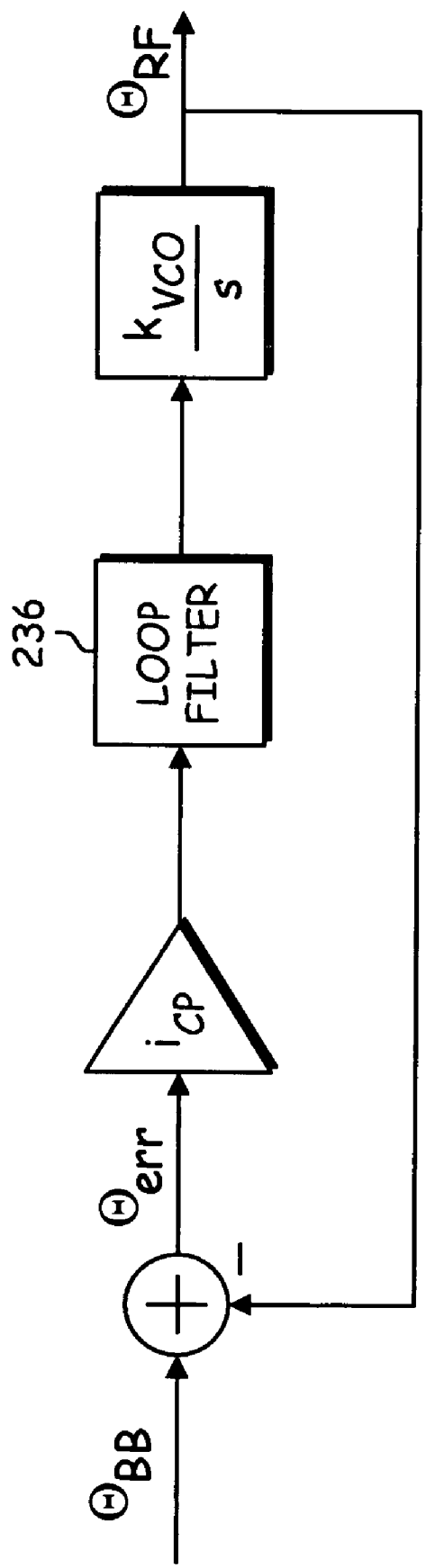
FIG. 6 illustrates a linearized model of the translational loop of a polar RF transmitter capable of modulating communication signals in different modes of operation, in accordance with an embodiment of the present invention.

FIG. 6 illustrates a linearized model of the translational loop of a polar RF transmitter capable of modulating communication signals in different modes of operation, in accordance with an embodiment of the present invention. This model represents the effective signal processing performed by the translational loop on the analog IF signal as it is translated to the RF. In FIG. 6, $\Theta_{BB}$ denotes the phase modulation generated by the digital processor, and $\Theta_{RF}$ denotes the phase modulation of the RF output signal. The transfer function between RF output and digital processor output can be expressed in terms of charge pump current $i_{CP}$, components of loop filter 236, and VCO sensitivity $k_{VCO}$, as described in more detail below in connection with FIG. 7.

Figure 7:
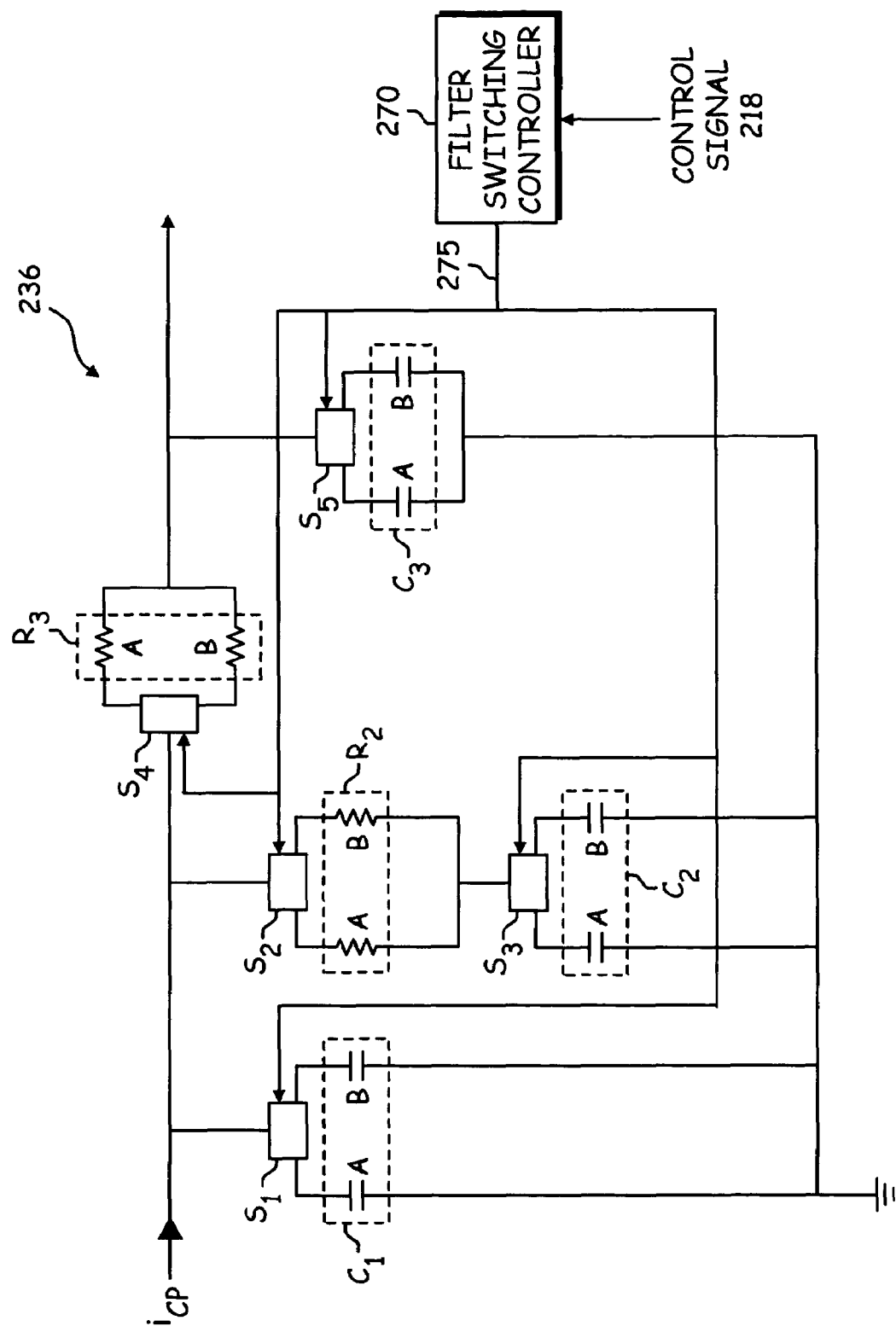
FIG. 7 is a circuit diagram illustrating an exemplary loop filter for use in the translation loop of a polar RF transmitter capable of modulating communication signals in different modes of operation, in accordance with an embodiment of the present invention.

FIG. 7 is a circuit diagram illustrating an exemplary loop filter 236 for use in the translation loop of a polar RF transmitter, in accordance with an embodiment of the present invention. The loop filter 236 includes loop components C1, C2, C3, R2 and R3. Referring now to both FIGS. 6 and 7, the values of the loop components determine the transfer function H(s) as follows:

$$H(s) \equiv \frac{\Theta_{RF}}{\Theta_{BB}} \qquad (2)$$

$$= \frac{i_{CP}k_{VCO}(C_2R_2s + 1)}{C_1C_2C_3R_2R_3s^4 + (C_1C_3R_3 + C_1C_2R_2 + C_2C_3R_2 + C_2C_3R_3)s^3 + (C_1 + C_2 + C_3)s^2 + i_{CP}k_{VCO}(C_2R_2s + 1)}$$

Hereinafter, the transfer function H(s) will be referred to as the PLL signal filter. Ideally, it is desirable that H(s)=1, such that $\Theta_{RF}=\Theta_{BB}$ for all frequencies. In this case, the PLL signal filter imposes no distortion on the signal, and therefore does not introduce modulation error. However, in practice, designing the PLL such that H(s)=1, i.e., has infinite bandwidth, is not possible. For example, it can be shown that loop stability considerations dictate that the bandwidth of the PLL signal filter be less than about 1/10 of the IF signal, i.e., for a 26 MHz IF signal, H(s) must have a bandwidth less than 2.6 MHz. Narrowing the PLL signal filter bandwidth reduces the amount of "feed-through" of the IF reference signal to the RF output signal. Reference feed-through is the result of several PLL component non-idealities, such as non-zero reset delay of the PFD as well as mismatches between the "up" and "down" current sources of the charge pump. These non-ideal effects create a periodic signal on the VCO control voltage corresponding to the reference frequency, and are thus translated to the RF signal as spurious emissions. Typically, in a high-speed digital CMOS process, the reset delay of the PFD is a few nano seconds, and the mismatch of the charge pump current sources 5-10%.

Thus, for the polar RF transmitter to modulate communication signals in different signal bandwidths, the filter components of the loop filter are each programmable with a different value A or B. For example, as shown in FIG. 7, filter switching controller 270 can set the state of switches S1, S2, S3, S4 and S5 such that a particular value A or B for each filter component C1, C2, C3, R2 and R3 is selected depending on the value a filter control signal 275 generated in response to receipt of the first control signal 218, which indicates the particular signal bandwidth (e.g., 200 kHz or 5 MHz) of the transmitted signal. It should be understood that the selection between two values for each filter component can be accomplished in numerous way. For example, in another embodiment (not shown), the values A or B for each filter component C1, C2, C3, R2 and R3 can be selected by the filter switching controller 270 switching between two discrete loop filters.

For example, in one embodiment, for GSM/EDGE signal bandwidths of 200 kHz, the "A" loop filter component values can be set to: C1=1.02 pF; C2=10.19 pF; C3=0.34 pF; R2=44.3 kΩ; and R3=44.3 kΩ, with a charge pump current of 40 μA and a VCO sensitivity of 10 MHz/V. In another embodiment, for CDMA signal bandwidths of 5 MHz, the "B" loop filter component values can be set to: C1=1.61 pF; C2=16.1 pF; C3=0.54 pF; R2=22.3 kΩ; and R3=22.3 kΩ.

However, the maximum narrowness of H(s) is mainly dictated by the bandwidth of the signal and the permissible modulation error. For example, in GSM, where the RMS transmitter phase modulation error performance must be better than 5° and the peak modulation error must be better than 20°, designing the PLL filter narrower than 1 MHz leads to prohibitively large modulation errors. In this case, the attenuation of reference feed-through by the PLL filter is limited, and, for practical PFD reset delays and CP current source mismatches in a CMOS process, may not suffice to meet the spurious emissions requirements of the GSM standard as stated in the example.

Modulation error as a result of a narrow PLL signal filter is due to both amplitude distortion as well as group delay variation over the signal band of interest. Stated differently, group delay variation causes different frequency components of the transmitter signal to travel through the transmitter at different speeds, thereby causing inter-symbol interference. Thus, in order to meet spurious emissions requirements and make the translational loop RF transmitter PLL signal filter sufficiently narrow, digital signal processing is employed in the digital processor to eliminate the modulation error problems otherwise caused by a narrow PLL signal filter. Specifically, the transmit signal generated by the digital processor is "pre-distorted" so as to counter act the distortion imposed by a narrow PLL signal filter. This "pre-distortion", or equalization process, is performed by the magnitude and group delay equalizer filters 190 and 204 shown in FIG. 5. The magnitude equalizer filter pre-distorts the amplitude of the transmit signal according to the inverse of the PLL signal filter magnitude response, and the group delay equalizer filter linearizes the phase response of the entire transmitter chain, i.e., pre-distorts the transmit signal such that the combined phase response of magnitude equalizer filter, group delay equalizer filter, and PLL signal filter is linear. The result is a translational loop transmitter that allows for a narrow PLL signal filter while providing high modulation accuracy. Therefore, as the filter component values of the loop filter 236 change with signal bandwidth, so must the filter coefficient values of the magnitude and group delay equalizers 190 and 204 in the digital processor 215.

Figure 8:
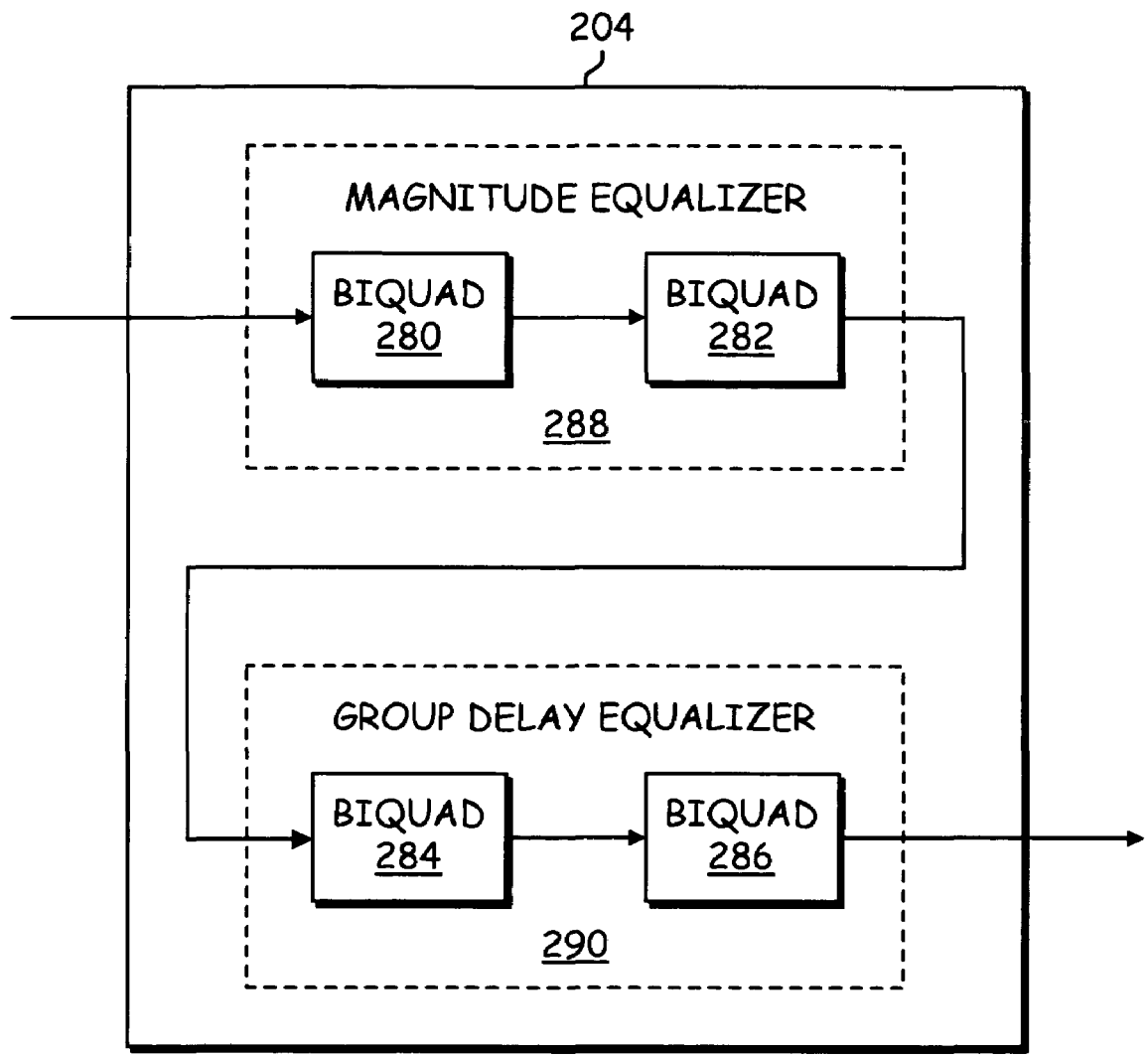
FIG. 8 is a functional block diagram of a magnitude and group delay equalizer, in accordance with an embodiment of the invention.

FIG. 8 is a functional block diagram of an exemplary magnitude and group delay equalizer filter (e.g., phase magnitude and group delay equalizer filter 204), in accordance with an embodiment of the invention. The equalizer filter 204 is shown implemented as a magnitude equalizer 288 followed by a group delay equalizer 290. The magnitude equalizer 288 includes a cascade of second order infinite impulse response (IIR) filters, or biquads, namely biquad 280 and biquad 282, while the group delay equalizer 290 includes a cascade of biquads, namely biquad 284 and biquad 286. Each equalizer 288 and 290 is implemented as a fourth order IIR filter i.e., a digital filter with a signal transfer function of the form $$H(z) = \frac{b_0 + b_1 z^{-1} + b_2 z^{-2} + b_3 z^{-3} + b_4 z^{-4}}{1 + a_1 z^{-1} + a_2 z^{-2} + a_3 z^{-3} + a_4 z^{-4}}. \tag{3}$$

Specifically, the magnitude equalizer 288 has a transfer function of $$H_{BQ}(z) = \frac{b_0 + b_1 z^{-1} + b_2 z^{-2}}{1 + a_1 z^{-1} + a_2 z^{-2}}, \tag{4}$$

and the group delay equalizer 290 has an all-pass transfer function of $$H_{BQ}(z) = \frac{c_0 + c_1 z^{-1} + z^{-2}}{1 + c_1 z^{-1} + c_0 z^{-2}}. \tag{5}$$

The all-pass transfer function of the group delay equalizer 290 changes the phase response to insure a constant group delay. It follows that the transfer function of the equalizer 204 is $$H(z) = \frac{b_0 + b_1 z^{-1} + b_2 z^{-2} + b_3 z^{-3} + b_4 z^{-4}}{1 + a_1 z^{-1} + a_2 z^{-2} + a_3 z^{-3} + a_4 z^{-4}}. \tag{6}$$

It should be understood that although IIR filters are typically the best way to obtain equalization in the digital processor, in principle, any type of filter that provides the desired equalization functions can be used in the present invention.

Figure 9:
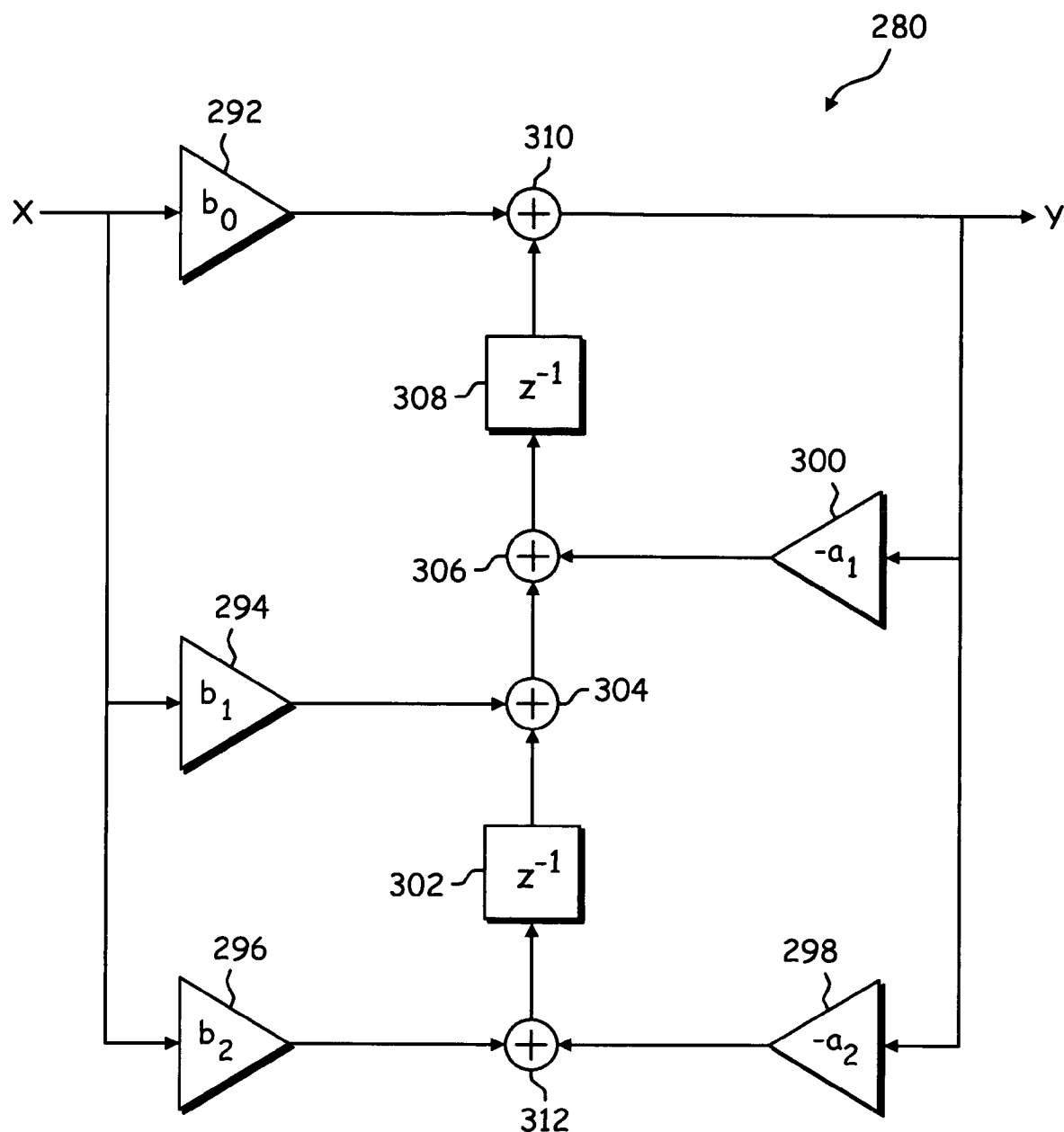
FIG. 9 is a schematic block diagram of a biquad for use in the digital processor of the polar RF transmitter capable of modulating communication signals in different modes of operation, in accordance with an embodiment of the present invention.

FIG. 9 is a schematic block diagram of a biquad (e.g., biquad 280) according to an embodiment of the present invention. The biquad 280 includes a plurality of feed forward multipliers 292-296 and feedback multipliers 298 and 300 that multiply the input signal X and output signal Y, respectively, by appropriate coefficients $b_o$, $b_1$, $b_2$, $-a_1$, and $-a_2$. Summing junction 312 produces a first summed output from the outputs of multipliers 296 and 298 and couples the first summed output to delay element 302. The delayed output is summed in summing junction 304 with multiplier 294 output to produce a second summed output. Multiplier 300 multiplies the output signal Y by coefficient $-a1$. The multiplied signal is summed in summing junction 306 with the second summed output to produce a third summed output. After a delay produced by delay element 308, the third summed output is summed in summing junction 310 with the output of multiplier 292 to produce the filter output Y. The biquad 280 has a transfer function of the form:

$$H(z) = \frac{b_0 + b_1 z^{-1} + b_2 z^{-2} + b_3 z^{-3} + b_4 z^{-4}}{1 + a_1 z^{-1} + a_2 z^{-2} + a_3 z^{-3} + a_4 z^{-4}}, \tag{10}$$

Figure 10:
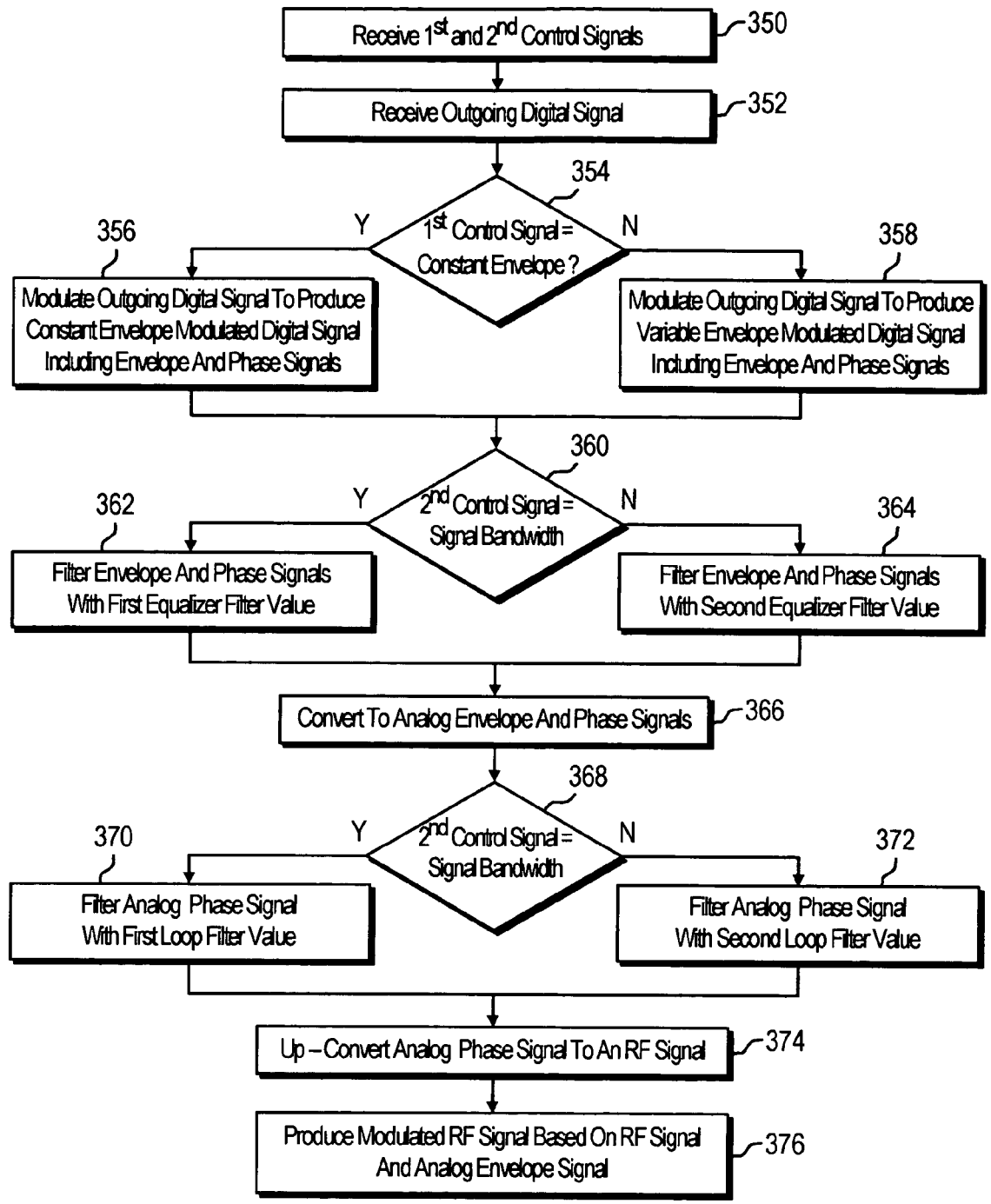
FIG. 10 is a flow chart illustrating one method of the present invention for modulating communication signals in different modes of operation.

FIG. 10 is a flow chart illustrating one method of the present invention for modulating communication signals in different modes of operation. A polar RF transmitter receives a first control signal (modulation control signal) indicating a type of modulation (e.g., PSK or GMSK) to be used in modulating an outgoing digital signal and a second control signal (filter control signal) indicating a signal bandwidth of the outgoing digital signal (step 350). A digital processor in the polar RF transmitter receives the outgoing digital signal including a plurality of data bits for transmission (step 352). The transmission data bits are typically received from a baseband processor, and represent the baseband digital data to be transmitted to a mobile host, such as hosts 18-23 of FIG. 1.

The method then modulates the outgoing digital signal to produce either a constant envelope modulated digital signal (step 356) or a variable envelope modulated digital signal (step 358) based on a logical value of the modulation control signal (step 354). Both the constant envelope modulated digital signal and the variable envelope modulated digital signal include an envelope signal (which is constant for the constant envelope modulated digital signal) and a phase signal. The modulation control signal is received from the baseband processor which selects the modulation mode.

Once the outgoing digital signal has been modulated, the modulated digital signal must be shaped to remove high-frequency components that cause the signal to spread into adjacent channels resulting in spectral mask violations. As a result of the modulation and pulse shaping, the pulse shaper produces either in-phase and quadrature PSK symbols when the modulation control signal has a first value or logic zeros when the modulation control signal has a second value as the envelope signal, and produces either binary GMSK symbols when the modulation control signal has the second value or logic zeros when the modulation control signal has the first value.

The envelope and phase signals are subsequently processed by equalizer filters (e.g., envelope and phase magnitude and group delay equalizer filters) to pre-distort the envelope and phase magnitude and group delay response to counteract non-ideal processing by the analog components of the transmitter. The equalizer filters are programmed with either a first equalizer filter value (e.g., a first set of filter coefficients) for filtering the envelope and phase signals (step 362) or a second equalizer filter value (e.g., a second set of filter coefficients) for filtering the envelope and phase signals (step 364) based on a logical value of the filter control signal that indicates the signal bandwidth (e.g., 200 kHz or 5 MHz) of the outgoing digital signal (step 360).

Thereafter, the method converts the digital envelope and phase signals to analog envelope and phase signals (step 364). The analog phase signal is filtered by a loop filter programmed with either a first equalizer filter value (e.g., a first value for each of the filter components) for filtering the analog phase signal (step 370) or a second equalizer filter value (e.g., a second value for each of the filter components) for filtering the analog phase signal (step 372) based on a logical value of the filter control signal that indicates the signal bandwidth (e.g., 200 kHz or 5 MHz) of the outgoing digital signal (step 368).

In addition to filtering the analog phase signal, the analog phase signal is up-converted from an IF signal to a RF signal (step 374). Finally, the method produces a modulated RF carrier signal based on the RF signal and the analog envelope signal (step 376).

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled".

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A polar RF transmitter within a radio transceiver for modulating communication signals in different modes of operation, comprising:

a digital processor operably coupled to receive an outgoing digital signal, a first control signal indicating a type of modulation and a second control signal indicating a signal bandwidth of the outgoing digital signal, the digital processor digitally modulating the outgoing digital signal to produce one of a constant envelope modulated digital signal and a variable envelope modulated digital signal based upon the first control signal, wherein the digital processor further includes:

a modulation switching controller operably coupled to receive the first control signal and operable to produce a modulation control signal to select one of a constant envelope modulation mode and a variable-envelope modulation mode based on the first control signal, a pulse shaper operably coupled to receive the modulation control signal and operable to produce the constant envelope modulated digital signal in the constant envelope modulation mode and the variable envelope modulated digital signal in the variable envelope modulation mode, wherein the constant envelope modulated digital signal and the variable envelope modulated digital signal each including an envelope signal and a phase signal, wherein the envelope signal of the constant envelope modulated digital signal is a constant envelope signal and the envelope signal of the variable envelope modulated digital signal is a variable envelope signal, a first filter switching controller operably coupled to receive the second control signal and operable to produce a first filter control signal to select one of a first equalizer filter value and a second equalizer filter value based on the second control signal, and filters programmable with one of the first equalizer filter value and the second equalizer filter value based on the first filter control signal to filter the envelope signal and the phase signal to produce a filtered envelope signal and a filtered phase signal;

first and second Digital-to-Analog converters (DACs) for converting the filtered envelope signal and the filtered phase signal, respectively, from digital signals to analog signals to produce an analog envelope signal and an analog phase signal;

first and second low pass filters for filtering the analog envelope signal and the analog phase signal, respectively;

a translational loop operably coupled to receive the analog phase signal to up-convert the analog phase signal from an IF signal to an RF signal, wherein the translational loop further includes:

a second filter switching controller operably coupled to receive the second control signal and operable to produce a second filter control signal to select one of a first loop filter value and a second loop filter value based on the second control signal, and a loop filter programmable with one of the first loop filter value and the second loop filter value based on the second filter control signal to filter the analog phase signal; and a power amplifier for producing a modulated RF signal based on the RF signal and the analog envelope signal.

2. The polar RF transmitter of claim 1, wherein the digital processor further includes:

a PSK symbol mapper operably coupled to receive the outgoing digital signal and operable to produce in-phase and quadrature PSK symbols based on the outgoing digital signal in variable envelope modulation mode and produce logic zero signals in constant envelope modulation mode; and a GMSK symbol mapper operably coupled to receive the outgoing digital signal and operable to produce binary GMSK symbols based on the outgoing digital signal in constant envelope modulation mode and produce logic zero signals in variable envelope modulation mode.

3. The polar RF transmitter of claim 2, wherein the PSK symbol mapper includes a 4PSK symbol mapper and an 8PSK symbol mapper selectable based on a third control signal.

4. The polar RF transmitter of claim 3, wherein the digital processor further includes:

delay mismatch circuitry for substantially canceling a timing mismatch between an analog portion of an envelope path along which the envelope signal propagates and an analog portion of a phase path along which the phase signal propagates when either the 4PSK symbol mapper or the 8PSK symbol mapper is selected.

5. The polar RF transmitter of claim 2, wherein the digital processor further includes:

envelope path adjustment circuitry operably coupled to receive the PSK symbols and operable to produce the envelope signal, wherein the envelope path adjustment circuitry includes the equalizer filters for the envelope signal; and phase path adjustment circuitry operably coupled to received the GMSK symbols and a PSK phase signal and operable to produce the phase signal, wherein the phase path adjustment circuitry includes the equalizer filters for the phase signal.

6. The polar RF transmitter of claim 1, wherein the loop filter comprises filter components, each being capable of being switchable between two respective values.

7. The polar RF transmitter of claim 1, wherein the loop filter comprises a first loop filter associated with the first loop filter value and a second loop filter associated with the second loop filter value, and wherein the second filter switching controller is operable to select one of the first loop filter and the second loop filter.

8. The polar RF transmitter of claim 1, wherein the equalizer filters comprise a phase magnitude equalizer and a phase group delay equalizer for pre-distorting the phase signal to substantially compensate for expected distortion in an analog portion of a phase path along which the phase signal propagates.

9. The polar RF transmitter of claim 8, wherein the phase magnitude equalizer and phase group delay equalizer are each programmable with one of two different sets of filter coefficients based on the second filter control signal.

10. The polar RF transmitter of claim 8, wherein the phase magnitude equalizer and the phase group delay equalizer each comprise one of a Finite Impulse Response (FIR) filter and an Infinite Impulse Response (IIR) filter.

11. The polar RF transmitter of claim 10, wherein the phase magnitude equalizer and the phase group delay equalizer include one or more biquads connected in series.

12. The polar RF transmitter of claim 8, wherein the equalizer filters further comprise an envelope magnitude equalizer and an envelope group delay equalizer for pre-distorting the envelope signal to substantially compensate for expected distortion in an analog portion of an envelope path along which the envelope signal propagates.

13. A method in a polar RF transmitter within a radio transceiver for modulating communication signals in different modes of operation, the method comprising:

modulating an outgoing digital signal to produce one of a constant envelope modulated digital signal and a variable envelope modulated digital signal based upon a value of a first control signal indicating type of modulation, wherein the constant envelope modulated digital signal and the variable envelope modulated digital signal each include an envelope signal and a phase signal, wherein the envelope signal of the constant envelope modulated digital signal is a constant envelope signal and the envelope signal of the variable envelope modulated digital signal is a variable envelope signal;

filtering the envelope signal and the phase signal to produce a filtered envelope signal and a filtered phase signal using equalizer filters programmed with one of a respective first equalizer filter value and a respective second equalizer filter value based on a value of a second control signal indicating a signal bandwidth of the outgoing digital signal;

converting the filtered envelope signal and the filtered phase signal, respectively, from digital signals to analog signals to produce an analog envelope signal and an analog phase signal;

filtering the analog phase signal using a loop filter programmable with one of a first loop filter value and a second loop filter value based on the value of the second control signal;

up-converting the analog phase signal from an IF signal to an RF signal; and producing a modulated RF signal based on the RF signal and the analog envelope signal.

14. The method of claim 13, wherein the step of modulating further comprises the steps of:

producing in-phase and quadrature PSK symbols based on the outgoing digital signal in a variable envelope modulation mode set by a first value of the first control signal; and producing logic zero signals as the in-phase and quadrature PSK symbols in a constant envelope modulation mode set by a second value of the first control signal.

15. The method of claim 14, wherein the step of modulating further comprises the steps of:

producing binary GMSK symbols based on the outgoing digital signal in the constant envelope modulation mode; and producing logic zero signals as the GMSK symbols in the variable envelope modulation mode.

16. The method of claim 13, wherein the loop filter comprises filter components, and wherein the step of filtering the analog phase signal further comprises the step of:

switching each of the filter components of the loop filter between two respective values.

17. The method of claim 13, wherein the loop filter comprises a first loop filter associated with the first loop filter value and a second loop filter associated with the second loop filter value, and wherein the step of filtering the analog phase signal further comprises the step of:

selecting one of the first loop filter and the second loop filter.

18. The polar RF transmitter of claim 13, wherein the step of filtering the envelope signal and the phase signal further comprises:

pre-distorting the phase signal to substantially compensate for expected distortion in an analog portion of a phase path along which the phase signal propagates.

19. The method of claim 13, wherein the equalizer filters include a phase magnitude equalizer and a phase group delay equalizer, and wherein the step of filtering the envelope signal and the phase signal further comprises:

programming the phase magnitude equalizer and the phase group delay equalizer with one of two different sets of filter coefficients based on the value of the second control signal.

20. The method of claim 13, wherein the step of filtering the envelope signal and the phase signal further comprises:

pre-distorting the envelope signal to substantially compensate for expected distortion in an analog portion of an envelope path along which the envelope signal propagates.

21. The method of claim 13, further comprising the step of:

canceling a timing mismatch between an analog portion of an envelope path along which the envelope signal propagates and an analog portion of a phase path along which the phase signal propagates.

* * * * *